US012545150B2

(12) United States Patent
Pardina-Malbran et al.

(10) Patent No.: US 12,545,150 B2
(45) Date of Patent: Feb. 10, 2026

(54) ROTATABLE OPERATOR STATION OF A WORK MACHINE

(71) Applicant: Deere & Company, Moline, IL (US)

(72) Inventors: Federico Pardina-Malbran, Fort Collins, CO (US); Scott N. Clark, Bettendorf, IA (US); John P. Andruch, III, Le Claire, IA (US); Aaron S. Ritter, Milan, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/392,560

(22) Filed: Dec. 21, 2023

(65) Prior Publication Data
US 2025/0206202 A1    Jun. 26, 2025

(51) Int. Cl.
  *B60N 2/14*    (2006.01)
  *B60N 2/02*    (2006.01)

(52) U.S. Cl.
  CPC ............. *B60N 2/14* (2013.01); *B60N 2/0278* (2023.08); *B60Y 2200/222* (2013.01)

(58) Field of Classification Search
  CPC ... B60N 2/14; B60N 2/24; B60N 2/04; B60N 2/143; B62D 33/0604
  USPC .................................................. 180/326–328
  See application file for complete search history.

(56) References Cited

U.S. PATENT DOCUMENTS

| 4,427,090 A * | 1/1984 | Fredriksen ........... B62D 33/073 |
| | | 296/190.04 |
| 4,937,796 A * | 6/1990 | Tendler ................. G01S 15/931 |
| | | 367/909 |
| 5,467,106 A * | 11/1995 | Salomon ........... G02F 1/133308 |
| | | 345/905 |
| 5,680,123 A * | 10/1997 | Lee ....................... G07C 5/0891 |
| | | 348/148 |
| 6,421,081 B1 * | 7/2002 | Markus .................. H04N 7/185 |
| | | 348/148 |
| 6,755,270 B2 * | 6/2004 | Saarinen .................. B60N 2/39 |
| | | 296/190.04 |

(Continued)

OTHER PUBLICATIONS

Nexat Revolution—The Next Level Of Agricultural Machinery, pp. 1-13, [online], [retrieved on Nov. 1, 2023]. Retrieved from the Internet <URL: https://farmerdb.com/nexat-revolution/>.

(Continued)

*Primary Examiner* — Paul N Dickson
*Assistant Examiner* — Caitlin Anne Miller
(74) *Attorney, Agent, or Firm* — Lucian Beavers; Patterson Intellectual Property Law PC

(57) ABSTRACT

The present disclosure is directed to apparatuses, system, and methods for rotating an operator station relative to another portion of an agricultural machine, such as a frame of the agricultural machine, to facilitate transport of the agricultural machine from one location to another. Transportation of the agricultural machine in this may include moving the agricultural machine in a direction that is conventionally considered to be the reverse direction of the agricultural machine. The operator station may include a cab of the agricultural machine or a portion of the cab, and the operator station may include one or more displays for displaying one or more images captured by an image capture device that is directed rearwardly of the agricultural machine.

19 Claims, 8 Drawing Sheets

(56) References Cited

U.S. PATENT DOCUMENTS

| | | | | |
|---|---|---|---|---|
| 7,159,687 | B2* | 1/2007 | Dunn | B62D 33/0633 |
| | | | | 180/326 |
| 8,985,263 | B2* | 3/2015 | Peterson | B60N 2/4242 |
| | | | | 180/317 |
| 9,057,221 | B2* | 6/2015 | Warr | E02D 17/13 |
| 10,421,504 | B2* | 9/2019 | Racchella | A01D 67/02 |
| 10,737,635 | B2* | 8/2020 | Tepper | A01D 67/04 |
| 10,785,913 | B2 | 9/2020 | Hill et al. | |
| 2006/0207822 | A1* | 9/2006 | Taylor | B62D 49/007 |
| | | | | 180/326 |
| 2008/0035408 | A1* | 2/2008 | Gristenbrei | B60N 2/38 |
| | | | | 297/344.21 |
| 2017/0061689 | A1* | 3/2017 | Petrany | H04N 7/18 |
| 2018/0312202 | A1* | 11/2018 | Racchella | B62D 33/0608 |
| 2025/0263133 | A1* | 8/2025 | dos Santos Carvalho | |
| | | | | B62D 33/0608 |

OTHER PUBLICATIONS

Autonomy in Action: These Machines Bring Imagination to Life, The Scoop, dated Jan. 28, 2022, pp. 1-10, [online], [retrieved on Dec. 19, 2023]. Retrieved from the Internet <URL: https://www.thedailyscoop.com/news/new-products/autonomy-action-these-machines-bring-imagination-life>.

How Does Structured Light 3D Scanning Work, dated Nov. 25, 2022, pp. 1-15, [online], [retrieved on Dec. 5, 2023]. Retrieved from the Internet <URL: https://www.artec3d.com/learning-center/structured-light-3d-scanning>.

* cited by examiner

ROTATABLE OPERATOR STATION OF A WORK MACHINE

FIELD OF THE DISCLOSURE

The present disclosure relates generally to work machines and, particularly, to work machines with rotatable operator station to facilitate transport of the work machine.

BACKGROUND OF THE DISCLOSURE

Agricultural work machines (e.g., combine harvesters) perform functions in the course of crop production. Some agricultural machines, such as combine harvesters, connected to an implement, such as a header, to perform useful work in a field, such as to prepare a field for planting or seeding, plant seed, treat crops, and harvest crops. Implements have widths that can span multiple rows of crop in a field and, consequently, can be much larger in width than the agricultural machine connected to the implement.

SUMMARY OF THE DISCLOSURE

An aspect of the present disclosure is directed to an agricultural machine including a frame; a ground engaging component connected to the frame and configured to move the frame across a ground surface in a first direction corresponding to a forward direction of the agricultural machine and a second direction, opposite the first direction, corresponding to a reverse direction of the agricultural machine; an operator station pivotably mounted to the frame; an actuator coupled to the operator station; an image capture device oriented to view an exterior of the agricultural machine towards the second direction and configured to capture an image of the exterior of the agricultural machine in the second direction; and a display configured to display the image captured by the image capture device. The display may be oriented to be viewable by the operator retained by the operator station when the operator station is pivoted by the actuator. The operator station may include a direction control device operable to alter a direction of movement of the agricultural machine, and the operator station may be configured to retain an operator. The actuator may be configured to pivot the operator station in response to an input.

Another aspect of the present disclosure is directed to a computer-implemented method performed by one or more processors for automatically configuring an agricultural machine for travel in a rearward direction. The computer-implemented method may include receiving input to operate the agricultural machine in a rearward direction; rotating an operator station of the agricultural machine about a pivot axis from a first position to a second position, the operator stations configured to retain an operator, relative to a frame of the agricultural machine; capturing an image from an image capture device, the image capture device oriented so as to be directed rearwardly; and displaying the captured image on a display, the display configured to be viewable by the operator retained in the operator station when the operator station is in the second position.

The various aspects of the disclosure may include one or more of the following features. The input may configure the agricultural machine for travel in the second direction. The input may configure the agricultural machine into a road mode for travel along a road. An input device may be configured to receive the input from the operator. The operator station may include a cab configured to house an operator. A cab may be mounted to the frame, and the operator station may include a portion of the cab. The display may be connected to the portion of the cab. The operator station may include a seat disposed within a cab. The display may be connected to the seat. The display may be mounted to an aft portion of the cab. The display may be movable with operator station. The display may be configured to be viewable by the operator when operator is facing in the second direction. The actuator may be configured to pivot the operator station 180° in response to receipt of the input.

The various aspects of the disclosure may include one or more of the following features. The operator station may include a cab of the agricultural machine, and rotating an operator station of the agricultural machine from a first position to a second position may include rotating the cab about the pivot axis from the first position to the second position. The operator station may include a portion of a cab of the agricultural machine, and rotating an operator station of the agricultural machine from a first position to a second position may include rotating the portion of the cab about the pivot axis from the first position to the second position. The portion of the cab may include a seat disposed in the cab. The display may be located on an aft portion of the cab, and the display may be oriented so as to face a forward direction. Receiving input to operate the agricultural machine in a rearward direction may include receiving an input to configure the agricultural machine into a transport mode for operating the agricultural machine along a road. The display may be mounted to and rotatable about the pivot axis with the operator station.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
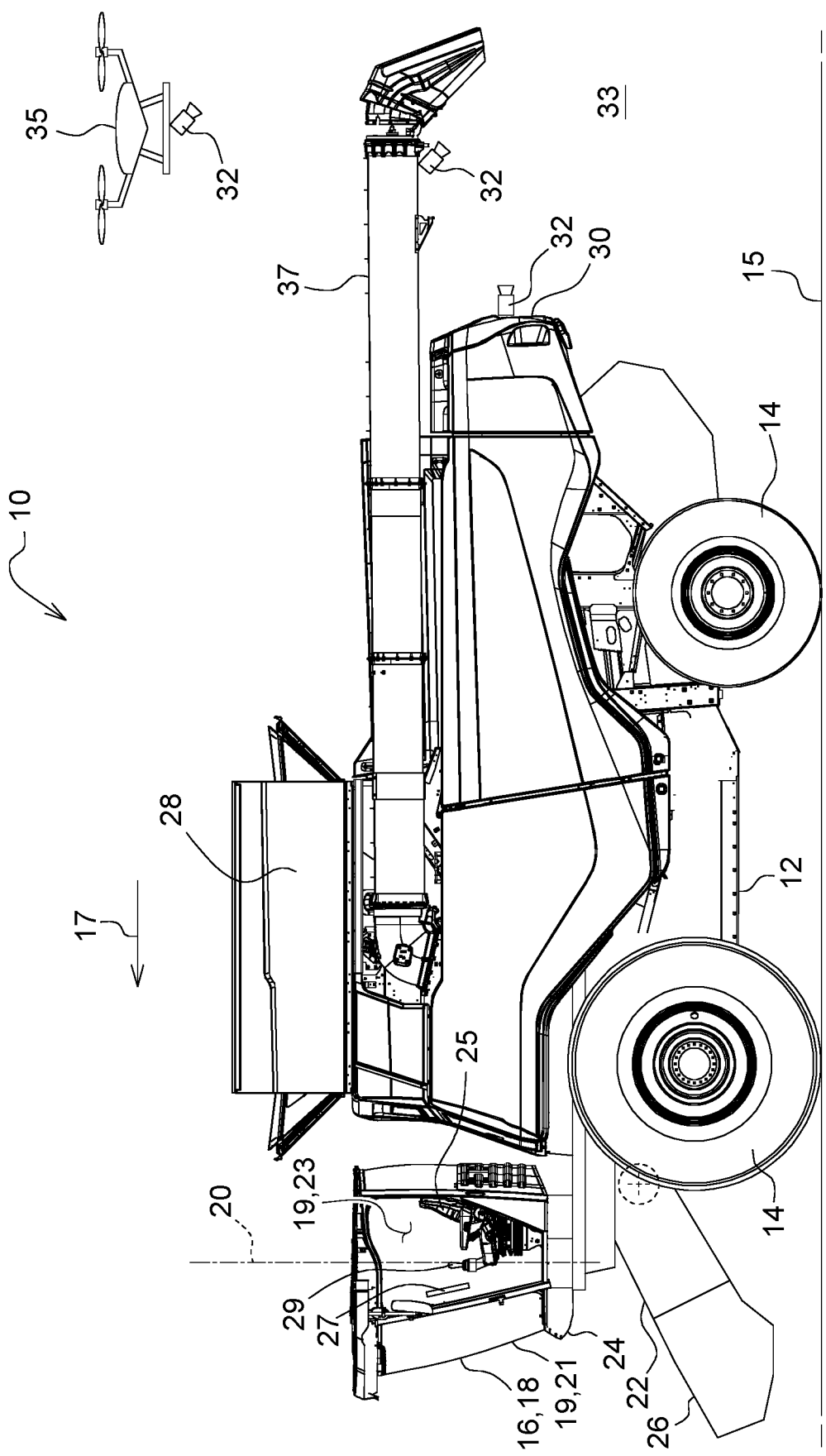
FIG. 1 is a diagrammatic side view of an example work machine, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to work machines, such as agricultural work machines, that include an operator station that is moveable (e.g., rotatable) to facilitate movement of the work machine from one location to another, such as during travel along a road. For example, an agricultural harvester uses a header to harvester crop in a field. Some headers extend across multiple rows of crop in a field, and the width of the header is greater than a width of the agricultural harvester. Further, some of the headers are foldable, and, when in the folded configuration, the header obstructs visibility of the operator in the operator station of the agricultural harvester when the operator is facing forward in the operator station. Further, for many work machines, including an agricultural harvester, the view towards the rear of the machine is obstructed or diminished, such as due to a form factor or construction of the work machine. Therefore, rearward visibility is reduced or entirely obstructed.

Further, movement of implements (including foldable implements in an unfolded configuration or other fixed or unfoldable implements) along a road is generally not possible due to the risk of impact between the implement and objects along the side of the road or with other traffic, e.g., oncoming traffic, on the road. However, forward visibility is obstructed with an implement, attached at the front of the work machine, is in the folded configuration or with another type of implement that may otherwise be narrow enough to travel along a road but also obstructs forward visibility when moved into a transport mode.

To accommodate movement of the work machine from one location to another, such as along a road, the present disclosure provides for work machines that include a pivotable operator station and a perception system to facilitate movement of the work machine. For example, the operator station is rotatable about an axis, such as a vertical axis, to a position in which the operator station faces rearwardly. In combination, an image capture device, such as one or more cameras, is arranged to capture an image (including still and video images) in a rearward direction. With the work machine configured in this way, the operator is able to operate and move the work machine in what is conventionally considered to be a reverse direction. However, with the work machine configured as described, the operator is facing the direction of travel of the work machine, which happens to align with what is normally considered to be the reverse direction of the work machine in order to move the work machine from one location to another, including movement along a road. The image or images captured by the capture device of the perception system is displayed to the operator on one or more displays. The one or more displays are positioned to present the captured image or images to the operator as the operator faces rearwardly. For example, in instances where the image capture device provides video, the operator is able to see a continuous view in the present direction of travel, allowing the operator to operate the work vehicle without a direct line of sight from the operator station. This allows the work machine to be transported with a folded implement remaining attached to the work machine. As such, time and cost associated with removing the header before departing to a new location, reattaching the implement at the new location, and transporting the implement are saved. This reduces an amount of time and cost required to move the work machine from one location to another, such as from one field to another, along a roadway.

Words of orientation, such as "up," "down," "top," "bottom," "above," "below," "leading," "trailing," "front," "back," "forward," and "rearward," are used in the context of the illustrated examples as would be understood by one skilled in the art and are not intended to be limiting to the disclosure. For example, for a particular type of vehicle in a conventional configuration and orientation and being operated in a conventional manner, one skilled in the art would understand these terms as the terms apply to the particular vehicle. For example, one skilled in the art would appreciate what the forward direction is in the context of a direction that a combine harvester normally moves when actively harvesting crop during a crop harvesting operation. Further, one skilled in the art would appreciate what the reverse direction would be for the agricultural harvester during normal operation of the agricultural harvester.

Additionally, the term "forward" (and the like) corresponds to a forward direction of travel of a work machine (e.g., header or combine harvester), such as during a harvesting operation. Likewise, the term "rearward" or "reverse" (and the like) corresponds to a direction opposite the forward direction of travel. In this regard, for example, a "forward facing" feature on a header may generally face in the direction that the head travels during normal operation, while a "rearward facing" feature may generally face opposite that direction.

Also as used herein, with respect to a work machine, unless otherwise defined or limited, the term "leading" (and the like) indicates a direction of travel of the work machine during normal operation (e.g., the forward direction of travel of a harvester vehicle carrying a header). Similarly, the term "trailing" (and the like) indicates a direction that is opposite the leading direction. In this regard, for example, a "leading" edge of a header may be generally disposed at the front of the header, with respect to the direction travel of the header during normal operation (e.g., as carried by a combine harvester). Likewise, a "trailing" edge of a header may be generally disposed at the back of the header opposite the leading edge, with respect to the direction of travel of the header during normal operation.

Although the present disclosure is made in the context of agricultural harvesters (e.g., combine harvesters), the scope of the present disclosure is not so limited. Rather, the scope of the disclosure encompasses work machines in numerous other industries whose forward visibility may become obstructed, such as during one or more conditions or one or more machine configurations during use.

FIG. 1 is a diagrammatic side view of an example work machine within the scope of the present disclosure. Particularly, FIG. 1 is a diagrammatic side view of an example agricultural machine 10 within the scope of the present disclosure. In the particular example, the agricultural machine 10 is an agricultural harvester, such as an agricultural combine harvester. However, the scope of the present disclosure encompasses other types of machines (e.g., vehicles), including other types of agricultural machines as well as other machines outside of the agricultural industry. The agricultural machine 10 includes a frame 12 and one or more ground engaging components, such as wheels 14 or tracks, that are in contact with an underlying ground surface 15. In the illustrative implementation, the wheels 14 are coupled to the frame 12 and are used to transport the agricultural machine 10 across the ground surface 15, such as in a forward operating direction, as indicated by arrow 17. In some implementations, operation of the agricultural machine 10 is controlled from an operator station 16. The operator station may be or include a cab 18. In some implementations, the operator station 16 is a portion of the cab 18 of the agricultural harvester 10. In some instances, the cab 18 is a full or partial enclosure from which the operator controls operation of the agricultural harvester 10.

The cab 18 includes one or more windows 19 through which an operator can view an exterior of the agricultural machine 10, such as when the operator is seated in seat 25 located within the cab 18. At least one of the windows 19 forms all or a potion of a forward wall 21 of the cab 18. Further, in some implementations, laterals sides 23 of the cab 18 may include one or more of the windows 19 to provide visibility of the environment at one or both of the lateral sides 23 of the cab 18. The cab 18 may also include one or more displays 27, visible to the operator, that are operable to display information, one or more images, or both to the operator. The cab 18 also includes one or more controls 29 used by the operator to control operation of the agricultural combine. For example, one of the controls 29 is used to switch the agricultural machine 10 between an agricultural operation mode in which the agricultural machine 10 configured to perform an agricultural operation and a road mode or transport mode in which the agricultural machine 10 is configured for transport from one location to another, such as along a road (e.g., a public road). Movement of the agricultural machine 10 occurring during the road mode or transport mode involves movement of the agricultural machine without performing an agricultural operation. In some implementations, operation of the agricultural machine 10 may be conducted by a human operator in the operator's cab 16, a remote human operator, or an automated system.

The agricultural harvester 10 also includes a feederhouse 22 disposed at a forward end 24 of the agricultural harvester 10. A header 26 is connected to the feederhouse 10 and is used to harvest crop and to conduct harvested crop material to the feederhouse 22 of the agricultural machine 10. The term harvested crop material, as used herein, includes grain (e.g., corn, wheat, soybeans, rice, oats) and material other than grain (MOG). The feederhouse 22 includes a conveyor that conducts the harvested crop to various components and systems within the agricultural machine 10 that process the crop material to separate grain from MOG. The separated grain is stored in a storage bin 28 while the MOG is expelled from the agricultural harvester 10, generally from the rear end 30. In some instances, the MOG is dispersed over the ground surface 15 while, in other instances, the MOG is deposited onto the ground surface 15 in a windrow.

The agricultural harvester 10 includes one or more image capture devices 32 that form a perception system. Example image capture devices include cameras (e.g., optical or visual radiation cameras or red, green, blue (RGB) cameras), lidar, radar (e.g., long-range terahertz radar, frequency-modulated continuous wave radar (FMCW), ground penetrating radar), ultrasonic sensors, thermal sensors (e.g., thermal cameras), stereo cameras, laser vibrometers, infrared nuclear magnetic resonance (NMR) cameras, infrared short-wave infrared (SWIR) cameras, infrared terahertz sensors, other sensors operable to capture or generate an image representative of an area being imaged, e.g., an area 33 aft of the agricultural machine 10, or a combination of these. For example, the scope of the present disclosure encompasses technologies that not only capture and image but technologies that generate data used to generate an image, model, or other representation of an area that could be used, for example, to maneuver a vehicle, either by an operator or by a controller or system for autonomous operation of the vehicle. Thus, the images within the scope of the present disclose encompasses two-dimensional (2D) images and three-dimensional (3D) images, including captured or generated images. Further, the scope may also include 3D scanning technologies. Some of the 3D scanning technologies may include or utilize structured lights. Although the one or more image capture devices 32 is shown attached agricultural machine 10, in other implementations, one or more of the image capture devices 32 may be detached from the agricultural machine 10. For example, in some instances, the one or more image capture devices 32 are included on one or more an unmanned aerial vehicles (UAVs) 35 that is tethered or untether to the agricultural machine 10 or another vehicle. Further, in some implementations, the one or more image capture devices 32 may be provided exclusively on the UAV. Thus, the present disclosure encompasses one or more image capture devices provided exclusively on the agricultural machine, exclusively on one or more UAVs, or shared amongst the agricultural machine and one or more UAVs. In some implementations, one or more of the image capture devices 32 is attached to an unloader 37 of the agricultural machine 10. However, in other implementations, one or more of the image capture devices 32 are attached to other locations on the agricultural machine 10. In some implementations, one or more image capture devices 32 are positioned on or adjacent to a lateral side of the agricultural machine 10. When positioned at a lateral side of the agricultural machine 10, the image capture device 32 may be directed rearwardly to image an aft area of the agricultural machine 10 or angled to image an area that is after and adjacent the agricultural machine 10. In still other implementations, one or more image capture devices 32 are positioned at other locations on or proximate to the agricultural harvester 10. Still further, in some implementations, a single image capture device 32 is used. Thus, the present disclosure encompasses one or more image capture devices 32.

Figure 2:
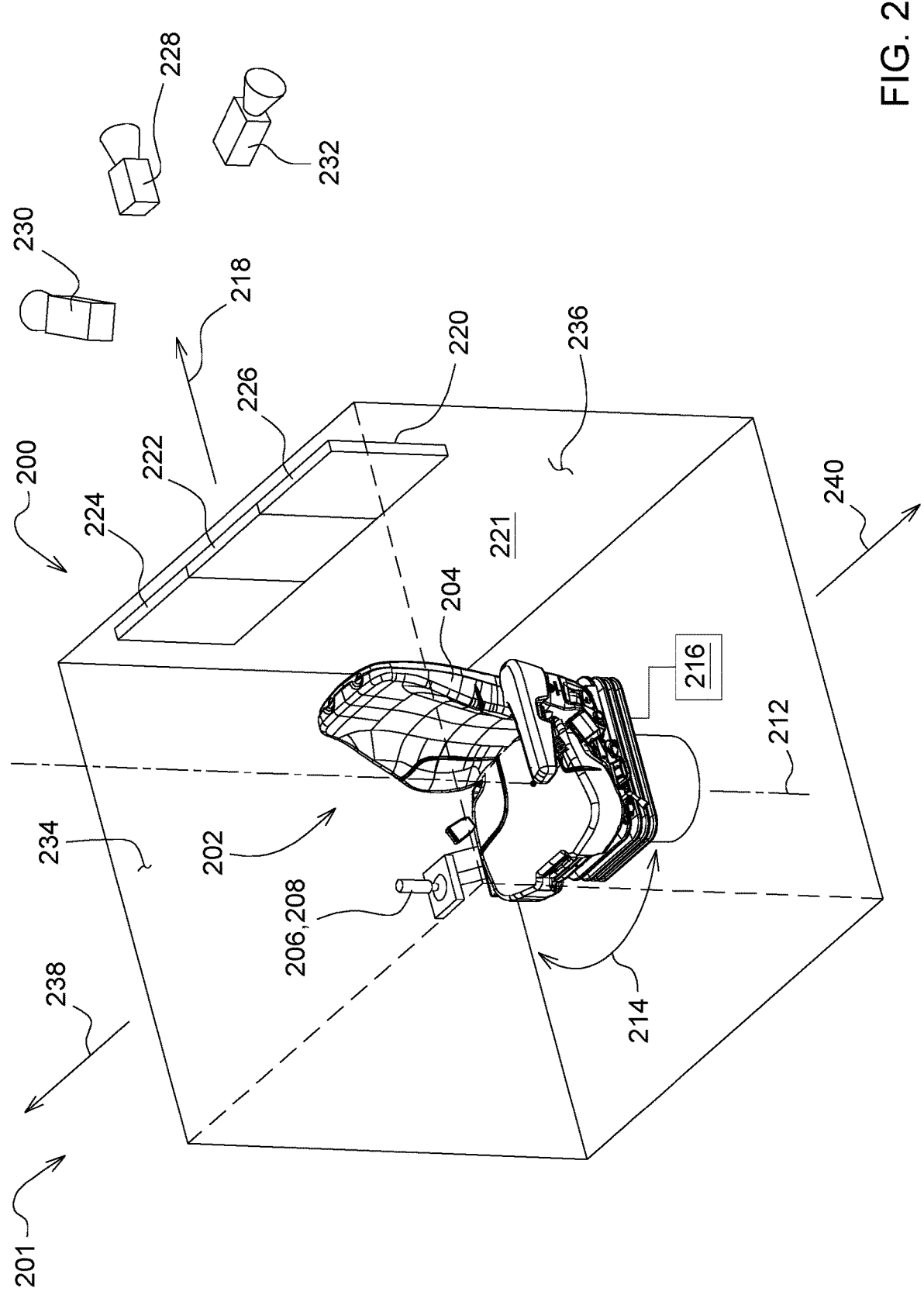
FIG. 2 is a perspective view of an example cab, according to some implementations of the present disclosure.

FIG. 2 is a perspective view of an example cab 200, which may be similar to cab 18, of an agricultural harvester 201. In the illustrated example, the operator station 202 includes a seat or chair 204 disposed within cab 200. In some instances, the operator station 202 includes one or more controls 206, such as a direction control input device 208 used by the operator to control a direction of travel of agricultural harvester 210. Examples of the direction control input device 208 include a joystick (as shown), a steering wheel (as shown, for example, in FIG. 3), or other directional input device. In some instances, the operator station 202 also includes other controls 206, such as a throttle or speed control to control the speed of the agricultural harvester 210, a brake control to slow or stop the agricultural harvester 210, or other desired controls. Thus, in some implementations, controls 206 such as steering, propulsion, and braking, form part of the operator station 202 and are rotatable therewith. In the illustrated example, the operator station 202 (including the associated controls 206) is rotatable within the cab 200 about axis 212, as indicated by arrows 214. The operator station 202 is rotatable in response to operation of an actuator 216, shown diagrammatically. Although the axis 212 is shown extending through the chair 204, in other implementations, the axis 212 may not extend through the chair 204 or may extend through the chair 204 at another location. In some instances, the operator station 202 is rotatable about axis 212 to cause the chair 204 to face rearwardly in the direction of arrow 218. Consequently, an operator seated in chair 204 would also face rearwardly when the operator station 202 is rotated about the axis 212. In some instances, the operator station 202 is rotated by 180° or approximately 180° to cause the seat 204 to face rearwardly. Although rotation by 180 or approximately 180° is described, in some implementations, the operator station 202 is rotatable by a different amount, such as an amount greater or less than 180°, so that an operator in the seat 204 faces rearwardly or generally rearwardly.

Figure 3:
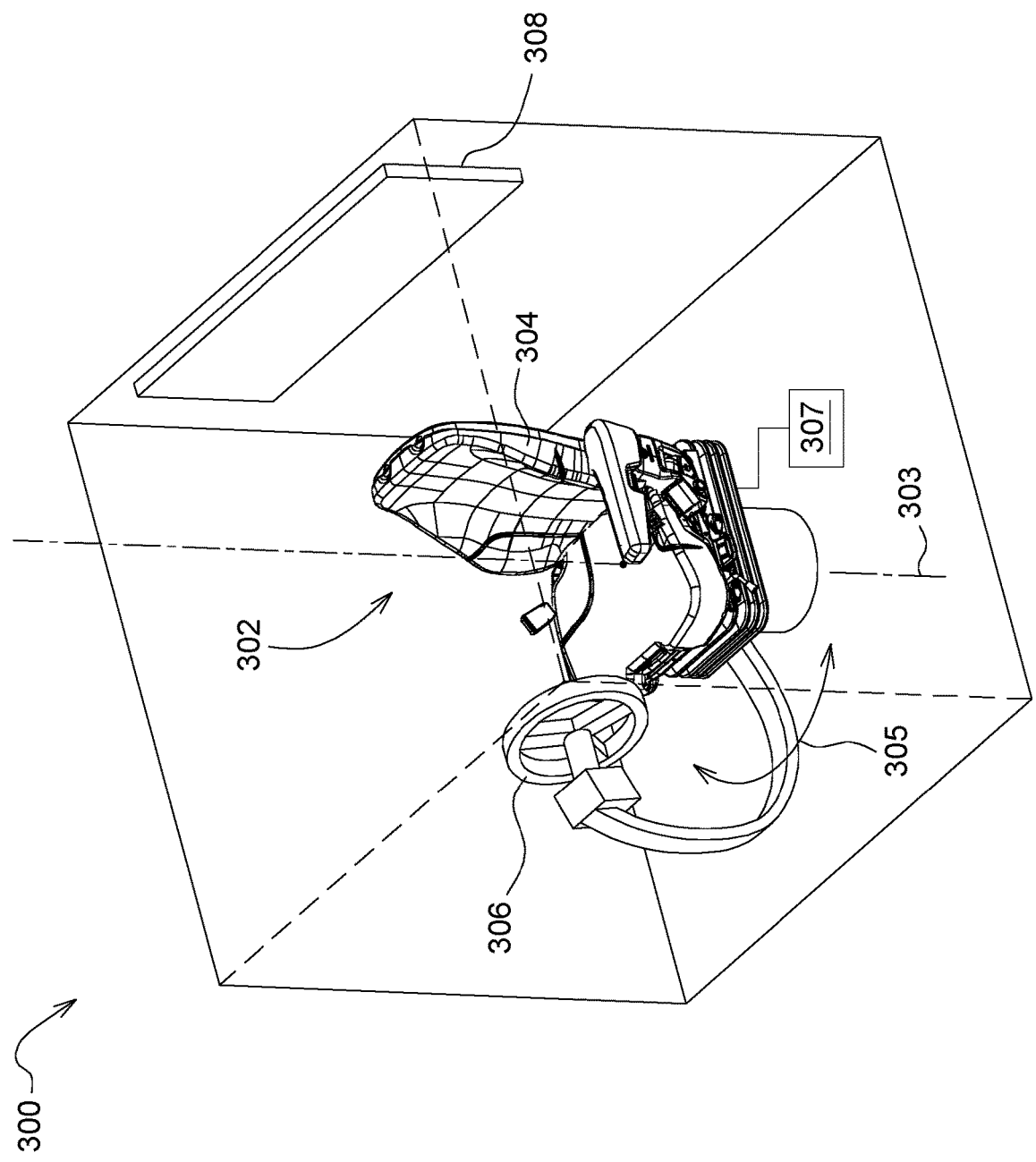
FIG. 3 is a perspective view of another example cab, according to some implementations of the present disclosure.

FIG. 3 is perspective view of another example cab 300 that includes an operator station 302 that is rotatable within the cab 300 about axis 303, as indicated by arrows 305. The operator station 302 is rotated about axis 303 by an actuator 307, shown diagrammatically. The operator station 302 includes a chair 304 and a steering wheel 306. Thus, the chair 304 and the steering wheel 306 are rotatable within the cab 300 as described herein. Similar to the operator station 202, described earlier, the operator station 302 may include additional or fewer controls. Additionally, although the axis 303 extends through the chair 304, the axis may be provided at another location. As described above, the operator station 302 is rotatable about the axis 303 to cause the chair 304 to face rearwardly. For example, the operator station 302 is rotated by 180° or approximately 180° to cause the chair 304 to face rearwardly.

Actuators that function to rotate the operator station, such as actuators 216 and 307, may be any type of actuators configured to perform such a function. For example, actuators operable to rotate the operator station with the scope of the present disclosure include linear actuators and rotary actuators, including electrical, mechanical, and hydraulic actuators. Any actuator that is configured or configurable to rotate the operator station, such as operator station 202, operator station 302, or cab 18 (where cab 18 forms that operator station 16), are within the scope of the present disclosure. Further, actuators include motors, such as electrical or hydraulic motors. The actuator may encompass a system, such as a motor and one or more gears that operator to rotate the operator station.

In yet still other implementations, the entire cab 200 is pivotable on a frame, e.g., frame 12, of the agricultural harvester 210. For example, referring to FIG. 1, the cab 18 is rotatable about axis 20. In some instances, the cab 18 is the operator station 16 and is rotatable about the axis 20 by 180° or approximately 180° such that, when the cab 18 is rotated, the operator faces rearwardly, as shown, for example, in FIG. 4. In other implementations, the cab 18 can be rotated by any amount. For example, the cab 18 can be rotatable about the axis 20 by an amount greater or less than 180°.

In some implementations, the operator station is described as including a chair to accommodate an operator. In other implementations, the operator station may include accommodations that allows the operator to stand while operating the agricultural machine, such as a backrest that lacks a seating surface. Thus, the operator station encompasses features to allow the operator to sit or stand during operation of the agricultural machine.

Figure 4:
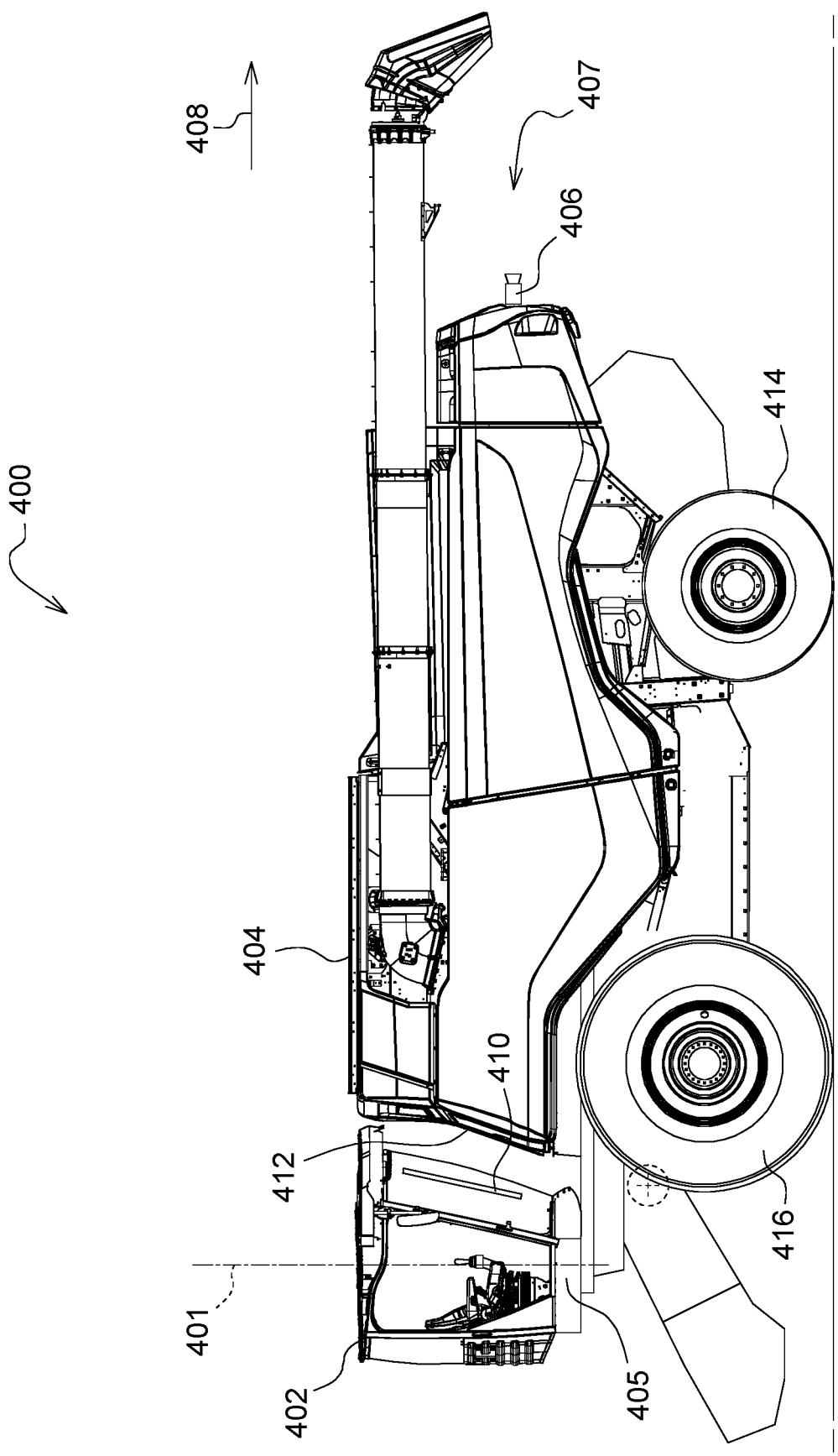
FIG. 4 is a side view of an example agricultural machine that includes a cab rotatable relative to another portion of the agricultural machine, according to some implementations of the present disclosure.

FIG. 4 is a side view of an example agricultural machine 400, which is a combine harvester in the illustrated example. As shown in FIG. 4, a cab 402 of the agricultural machine 400 is rotated 180° from a normal, forward-facing position about an axis 401. Consequently, in this orientation, the cab 402 faces rearwardly.

The cab 402 is rotatable about the axis 401 in response to an input from an operator, such as an operator within the cab 402. In some instances, the cab 402 is rotatable in response to a setting inputted to the agricultural machine (e.g., by the operator in the cab 402 or by a user remote from the agricultural machine 400). For example, placing the agricultural machine 400 in a road or transport mode causes rotation of the cab 402 about the axis 401 such that the cab 402 faces rearwardly as shown in FIG. 4. An actuator 405 operates, in response to the input, to rotate the cab 402 about the axis 401.

As shown, the operator's vision is obstructed by a body portion 404 of the agricultural machine 400, effectively limiting the operator's view to the lateral sides. However, the agricultural machine 400 includes a perception system 407. The perception system 407 includes an image capture device 406 (such as one or more of the image capture device described herein or otherwise within the scope of the present disclosure) that faces rearwardly in a direction of arrow 408. In some implementations, a direction in which the image capture device 406 is directed may be angled about a horizontal axis, a vertical axis, or both, such that the image capture device 406 has an oblique orientation but generally is directed rearwardly. Although a single image capture device 406 that captures one or more images (e.g., one or more still images or video images), the perception system 407 may include additional image capture devices. Further, the one or more image capture devices 406 may be positioned at the various locations described herein or otherwise within the scope of the present disclosure.

The one or more images provided by the image capture device 406 is displayed on a display 410 within the cab. Although one display 410 is illustrated, in other implementations, more than one display 410 is included. In some implementations, the display is in the form of a heads-up display where an image is projected onto a screen or surface within the cab 402. In some implementations, a display within the scope of the present disclosure includes a headset, such as a virtual reality headset or a headset that includes or incorporates one or more displays to display images to the eyes of the wearer. Thus, one or more images from the image capture device 406 is displayed to the wearer (who may also be the operator of the agricultural machine) using the one or more displays included with the headset. In this illustrated configuration, the operator faces a direction of "forward" travel the corresponds to a rearward direction in the context of when the agricultural machine 400 is operating normally. Further, using the one or more images displayed on the display 410, the operator is able to move the agricultural machine 400 in the direction of arrow 408 notwithstanding the obstruction to the operator's vision posed by the body portion 404. In the illustrated example, wheels 414 are steerable. Thus, as the agricultural machine is driven in the direction of arrow 408, the agricultural machine 400 is steerable in a manner similar to a convention automobile and provides haptic feedback consistent with normal operation of the agricultural machine 400 since the operator faces the same direction in which the agricultural machine 400 is moving. In other implementations, wheels 416 are steerable. In still other implementations, wheels 414 are steerable. In still other instances, both wheels 414 and 416 are steerable.

In FIG. 4, the display 410 is provided in or as part of the cab 402. In other implementations, one or more of the displays 410 are located on a surface of the body portion 404, such as surface 412 that faces the cab 402 when the cab 402 is positioned as shown in FIG. 4.

Referring again to FIG. 2, the cab 200 includes one or more displays 220. In the illustrated example, the display 220 is mounted to a rear or back wall 221 or otherwise located aft of the chair 204. Thus, when the operator station 202 is rotated such that the operator positioned in the operator station 202 faces rearwardly (e.g., when the operator is seated in the chair 204), the operator faces the display 220. The display 220 displays images captured by the one or more image capture devices 32 or generated using information provided by the one or more image capture devices 32. As described herein, an image from an image capture device, such as image capture device 32, encompasses both an image captured by the image capture device or an image generated using information gathered by the image capture device. In some implementations, the display 220 displays one or more images from a single image capture device 32, such as one or more still images or a video feed. In other implementations, the display 220 displays one or more images from multiple image capture devices. For example, in some implementations, the display 220 may be divided into different zones, with each zone displaying an image or series of images from different image capture devices.

With continued reference to FIG. 2, in some implementations, the display 220 is divided into three portions 222, 224, and 226. For example, the three portions 222, 224, and 226 may be laterally arranged. In other implementations, the portions 222, 224, and 226 may have a different arrangement. In the illustrated example, the agricultural harvester 201 includes image capture devices 228, 230, and 232. The image capture device 228 is oriented along a longitudinal axis of the agricultural harvester 201 or along an axis parallel to the longitudinal axis of the agricultural harvester 201. Image capture device 230 is obliquely oriented to capture a portion of both a rear and side of the agricultural harvester 201 at first side of the agricultural harvester 201, and the image capture device 232 is positioned at a second side of the agricultural harvester 201, opposite the first side, and is oriented to capture a portion of both a rear and side of the agricultural harvester 201. The display 220 may display an image from a first image capture device 228 in a central portion 222; an image from image capture device 230 may be displayed on portion 224; and an image from image capture device 232 may be 232 may be displayed on portion 226. It is noted that the images from respective image capture devices 228, 230, and 232 are arranged on the portions 222, 224, and 226 with the same spatial relationship.

In still other implementations, multiple displays may be used. For example, one or more displays, which may be similar to display 220, may be provided on the back wall 221 and each of those displays may display an image from a different image capture device. In other instances, each of the displays may display images from multiple image capture devices or, collectively, each of the displays may display a portion of an image from a single image capture device. Further, in some instances, one or more displays may be located laterally to the operator station 202, such as on one or both of the lateral sides 234 and 236 of the cab 200. The displays positioned on the lateral sides 234 and 236 may display an image from an image capture device that is oriented in a direction that would face the respective area in respective directions 238 and 240. In such a way, the displays on the lateral sides 234 and 236 provide at least somewhat of a virtual environment to view adjacent areas of the agricultural harvester 201 that may otherwise be obstructed for the operator of the agricultural harvester 201 when positioned in the operator station 202. Referring to FIG. 3, the example cab 300 may have a display, e.g., display 308, or an arrangement of displays similar to those described herein.

With the display or arrangement of displays as described herein configured to display the image or images of one or more image capture devices, an operator in an operator station that is rotated to face rearwardly is provided with a virtual environment that provides visibility to an area facing rearwardly that is otherwise obstructed to the naked eye of the operator. This perception system provides for situational awareness that allows the operator to drive the agricultural harvester in what is conventionally considered a backwards direction to transport the agricultural harvester from one location to another. Because many agricultural harvesters include steerable rear wheels, with the operator facing a rearward direction, the operator can drive the agricultural harvester in the conventionally rearward direction in a manner similar to a conventional automobile since the steerable wheels of the agricultural harvester are now in a "forward" location in the context of driving the agricultural harvesters in the conventionally reverse direction. Further, with the operator oriented facing the same direction in which the agricultural machine is moved, the haptic feedback received by the operator from the machine is consistent with normal operation, i.e., forward facing when the agricultural machine is traveling in a forward direction.

Figure 5:
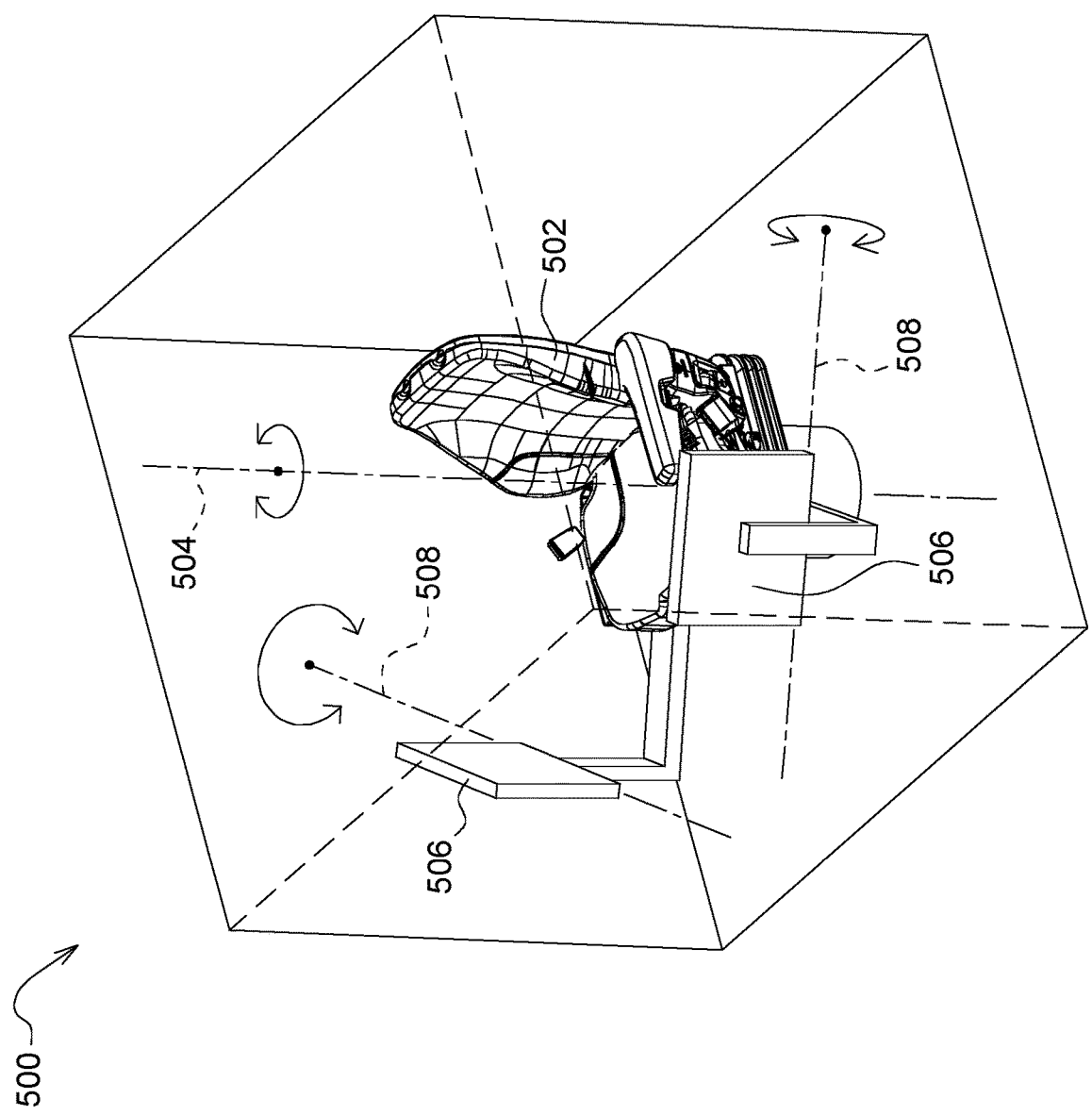
FIG. 5 is an oblique view of an operator station or portion thereof, according to some implementations of the present disclosure.

In still other implementations, one or more displays may be connected to the operator station, as shown, for example, in FIG. 5. FIG. 5 is an oblique view of an operator station 500 or portion thereof. The operator station 500 may be similar to operator station 202 and includes a seat 502 that is rotatable about a vertical axis 504. Similar to the seat 204, the seat 502 is rotatable about the vertical axis 504 to orient an operator in the seat 502 to face rearwardly. For example, similar to the seat 204, the seat 502 may be rotatable about the vertical axis 504 by 180°. In other implementations, the seat 502 is rotatable by more or less than 180° to orient the operator towards a rearward direction.

The operator station 500 includes displays 506. Although two displays 506 are illustrated, in other implementations, additional or fewer displays 506 may be used. In the illustrated example, the displays 506 are connected to the seat 502, and, consequently, are movable with the seat 502. Thus, as the seat 502 is rotated, the displays 506 are rotated likewise with the seat 502. In other implementations, one or more of the displays 506 are connected to another part of the operator station 500, as opposed to the seat 502, and remain rotatable with the operator station 500.

In some instances, one or more of the displays 506 is rotatable about an axis 508. As a result, the displays 506 can be rotated so that the displays 506 do not obstruct the view of the operator, such as when the operator station 500 is positioned so that the operator faces forward. This allows the operator to see out of the cab (i.e., view the environment through the forward window of the cab), which may be similar to cab 16, unobstructed by the displays 506, when operating of the agricultural machine. However, the displays 506 may be rotated about the axis 508 into a position to be viewable by the operator when the operator station 502 is rotated to face a rearward direction. In other implementations, the displays 506 may remain in a viewable position by the operator when the operator station 502 faces the forward direction. In this manner, the displays can display information to the operator during the course of operating the agricultural machine. Thus, in some implementations, the one or more displays 506 can be pivoted so as to avoid obstructing the view of the operator when the operator station 502 faces forward or be positioned in view of the operator when the operator station 502 faces forward to display information to the operator, such as information regarding an operation being performed by the agricultural machine, one or more images, or both.

Figure 6:
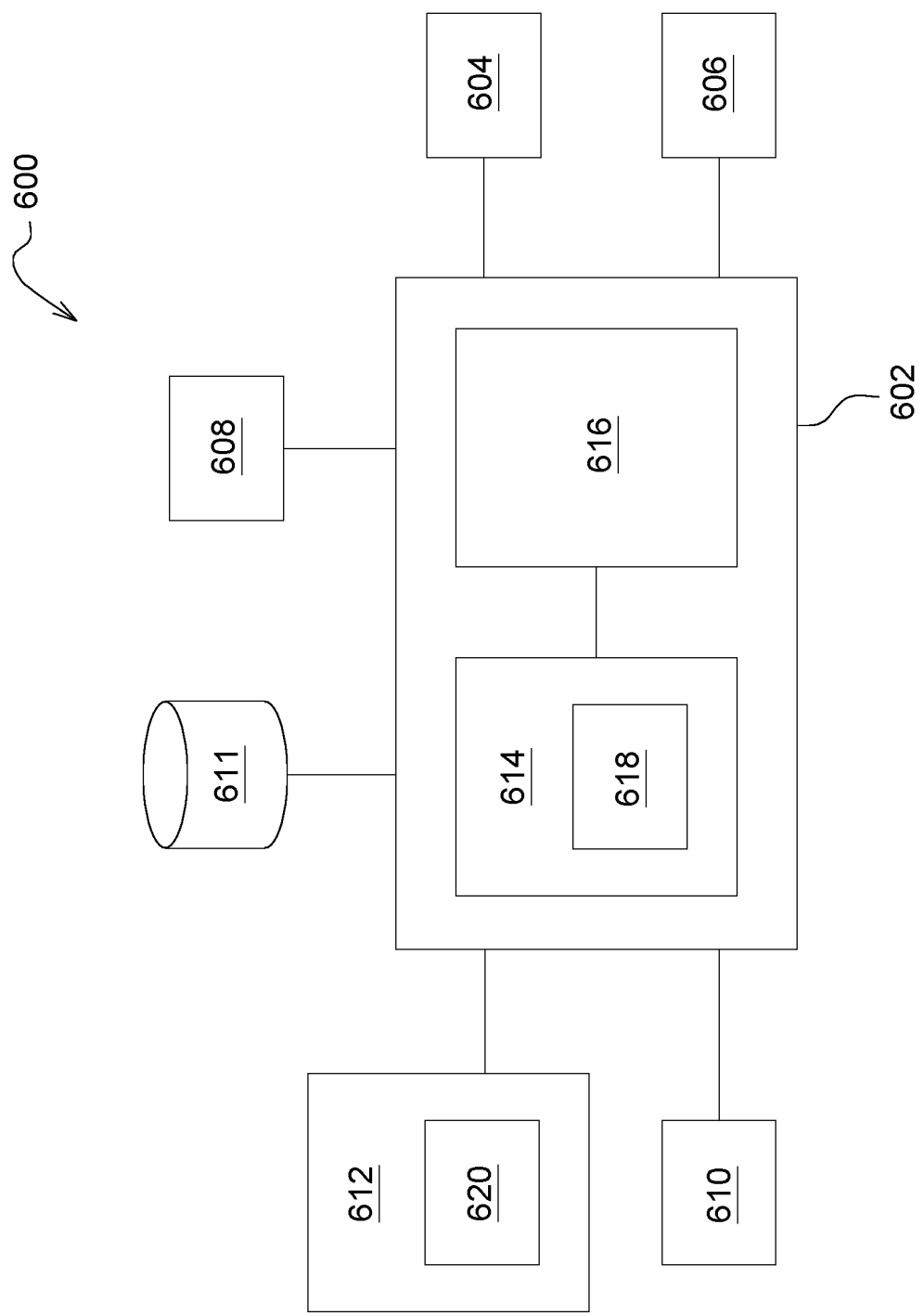
FIG. 6 is a schematic view of an example electronic control system operable to control changing configuration of an operator station of a work machine, according to some implementations of the present disclosure.

FIG. 6 is a schematic view of an example electronic control system 600 operable to control changing configuration of an operator station, such as an operator station described herein, between an agricultural operation mode and a road or transport mode. The control system 600 includes an electronic controller 602, an actuator 604, an image capture device 606 (which may be similar to the image capture devices 228, 230, 332, or 406 and may be of a type as described herein or otherwise within the scope of the present disclosure), a display 608 (which may be similar to displays 220, 308, 506, or 410), and an input device 610. In some implementations, the control system 600 also includes another display 612, described in more detail below. The control system 600 is operable to control operation of the actuator 604, the image capture device 606, and the display 608. Although a single actuator 604, a signal image capture device 606, and a single display 608 are illustrated, in other implementations, more than one actuator 604, image capture device 606, and display 608 are used. The actuator 604 is operable to pivot an operator station about an axis to change an orientation of the operator station, as explained earlier. The image capture device 606 is operable to capture or generate one or more images, and the one or more images are displayed on the display 608. In some implementations, in addition to display of the one or more images, the display 608 displays other information, such as information related to operation of the control system 600, information related to an agricultural operation, or other information.

The control system 600 may also include or be communicably coupled to a remote database 611, which may be in the form of cloud storage, a remote server, or some other type of electronic storage configured to store information.

In some implementations, the controller 602 is an electronic computer, such as computer 802 described in more detail below. The controller 602 includes a processor 614 and a memory 616 communicably coupled to the processor 614. Additional details of the controller 602, such as processor 614 and memory 616, are described below in the context of computer 802. In some implementations, the controller 602 is communicably coupled with a network, such as in a manner described in more detail below in the context of FIG. 8. The memory 612 communicates with the processor 614 and is used to store programs and other software, information, and data. The processor 614 is operable to execute programs and software and receive information from and send information to the memory 616. Although a single memory 616 and a single processor 614 are illustrated, in other implementations, a plurality of memories, processors, or both may be used. Although the processor 614 and the memory 616 are shown as being local components of the controller 602, in other implementations, one or both of the processor 614 and memory 616 may be located remotely. The various components of the control system 600 are communicably coupled to the controller 602, such as via a wired or wireless connection.

Software 618, such as in the form of an application or program, is executed by the processor 614 to control operation of the control system 600, as described herein. Particularly, the software 618 includes executable instructions operable to control operation of the various components coupled to the controller 602 and, as a result, control movement of an operator station (i.e., by controlling operation of the actuator 604), operation of the image capture device 606 to generate one or more images and display the generated image or images on the display 608. For example, the software 618 includes instructions to cause the processor 614 to perform example method 700, described in more detail below.

Example input devices 610 include a keyboard, keypad, one or more buttons, a slider bar, a dial, a knob, a mouse, a joystick, or wheel. The input device 610 is used to receive input, such as from an operator or from another source, to configure an operator station between an agricultural operation mode or configuration and road or transport mode or configuration. In some implementations, the display 612 displays information, such as information related to the operation of control system 600. For example, information displayed by the display 612 may include an orientation of an operator station or an activation status of the image capture device 606. In some implementations, the display 608 displays both the one or more images from the image capture device 606 and information, such as the information regarding operation of the control system 600, other information related to the operation of the agricultural harvester associated with the operator station, or other information. Thus, in some implementations, the display 612 may be omitted. In some instances, the information displayed by the display 608 or 612 is displayed via a graphical user interface (GUI) 620. Example displays (e.g., display 27, 220, 308, 410, 506, 608, and 612) include cathode ray tubes (CRT), liquid crystal displays (LCDs), plasma displays, projection systems (e.g., an image projector), and heads up displays. Other types of displays are also within the scope of the present disclosure. In some implementations, one or both of the displays 608 and 612 are a touch screen that is operable to receive input from a user via a user's touch. In some implementations in which one or both of the displays 608 and 612 is a touch screen, the input device 610 may be omitted.

Figure 7:
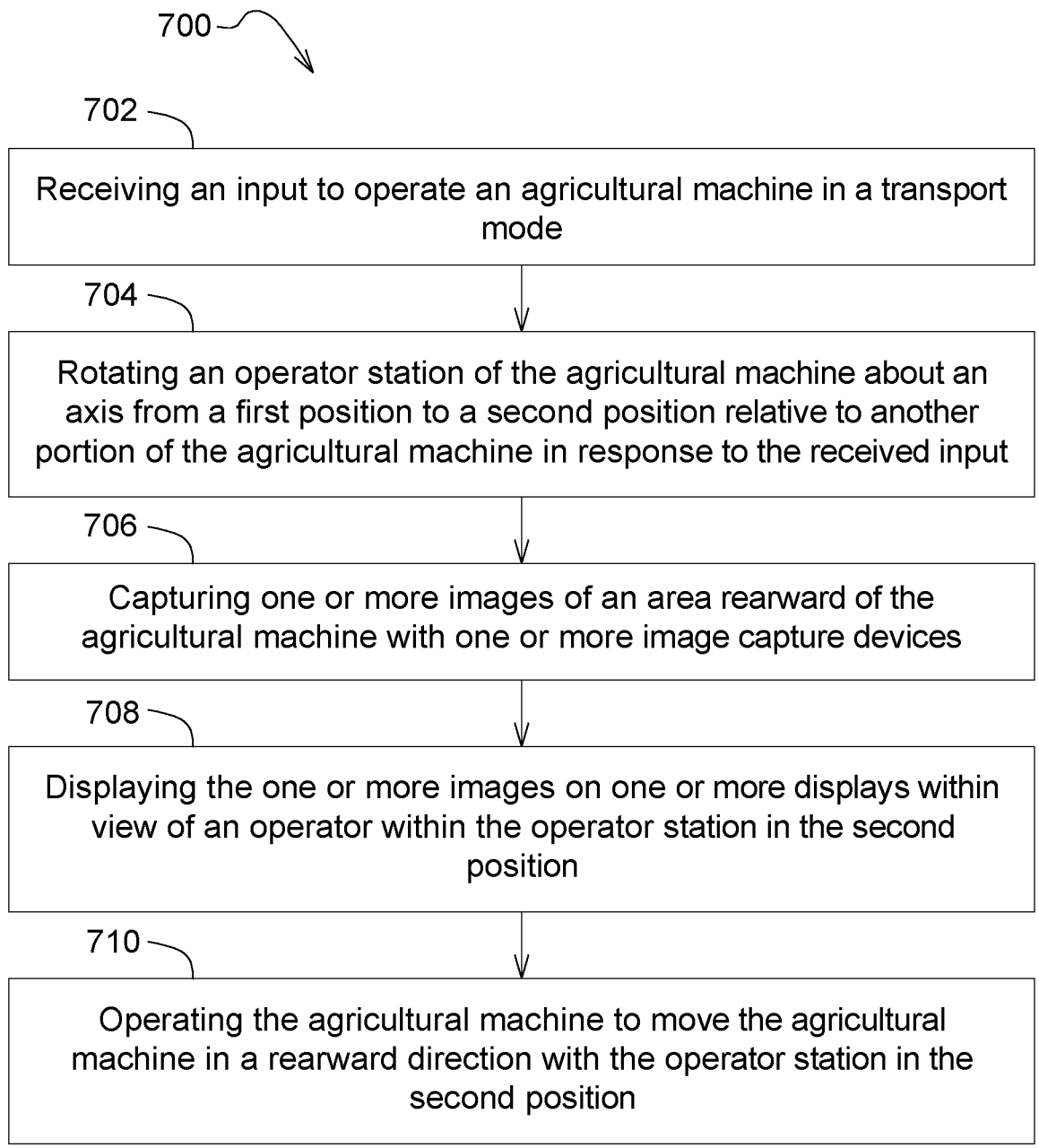
FIG. 7 is a flowchart of an example method for configuring a control station between a first position and a second position, according to some implementations of the present disclosure.

FIG. 7 is a flowchart of an example method 700 for configuring a control station between a first position associated, for example, with an agricultural operation mode and a second position associated with a road or transport mode. At 702, an input is received to operate an agricultural machine (e.g., an agricultural harvester) in the transport mode. In the transport mode, the agricultural machine is driven in a direction that is conventionally the reverse or rearward direction to move the agricultural machine from one location to another without performing an agricultural operation. In the transport mode, the agricultural machine is configured for operating in reverse direction to operate the agricultural machine along a road. At 704, the operator station is rotated about an axis from the first position to the second position relative to a frame or another part of the agricultural machine in response to the received input. In the second position, the operator station faces the rearward direction. Consequently, the operator station faces rearwardly. As explained earlier, the operator station may be a cab of the agricultural machine or a portion of the cab, such as a seat. In some instances, the portion of the cab includes a seat and one or more controls, as described herein. At 706, an image capture device captures one or more images of an area rearward of the agricultural machine. In some implementations, the image capture device is oriented so as to be directed rearwardly. At 708, the one or more images captured by the image capture device are displayed on a display. In some implementations, the display is oriented to be viewed by an operator in the operator station when the operator station is in the second position. In some implementations, the display is located on an aft portion of the cab, and the display is oriented so as to face a forward direction. In the forward direction, the display is faces and is viewable by an operator when the operator station is in the second position. In some implementations, the display is connected to the operator station and rotatable therewith. The example method 700 may include fewer, additional, or different features. For example, in some implementations, at 710, the method 700 includes operating the agricultural machine to move the agricultural machine in a rearward direction with the operator station in the second position across a surface. The method 700 may also include rotating the operator station from the second position to the first position when the agricultural machine has reached a desired location. In this way, the agricultural machine is configured to perform an agricultural operation.

Figure 8:
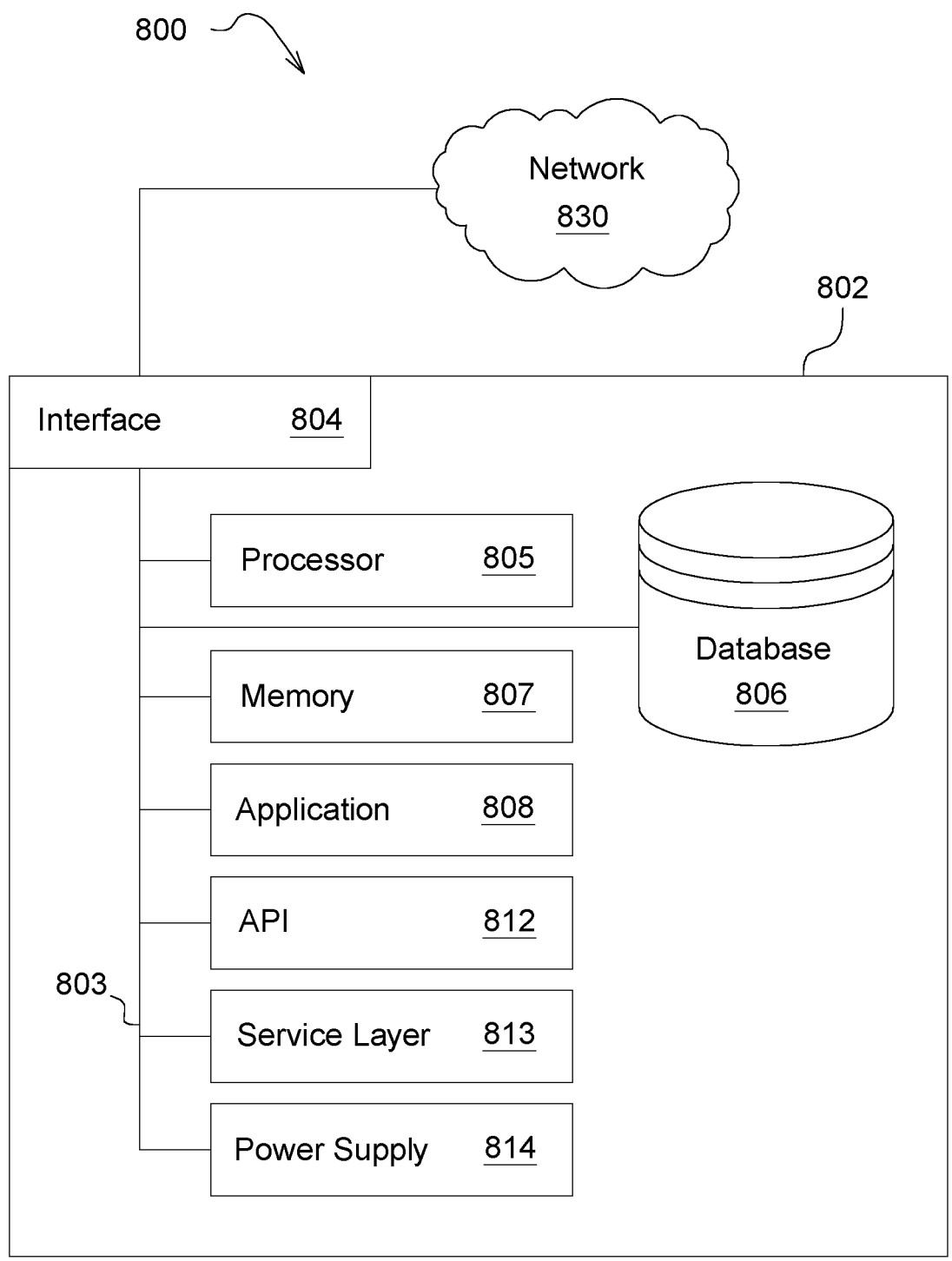
FIG. 8 is a block diagram illustrating an example computer system used to provide computational functionalities associated with described algorithms, methods, functions, processes, flows, and procedures as described in the present disclosure, according to some implementations of the present disclosure.

FIG. 8 is a block diagram of an example computer system 800 used to provide computational functionalities associated with described algorithms, methods, functions, processes, flows, and procedures described in the present disclosure, according to some implementations of the present disclosure. The illustrated computer 802 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 802 can include input devices such as keypads, keyboards, and touch screens that can accept user information. Also, the computer 802 can include output devices that can convey information associated with the operation of the computer 802. The information can include digital data, visual data, audio information, or a combination of information. The information can be presented in a graphical user interface (UI) (or GUI).

The computer 802 can serve in a role as a client, a network component, a server, a database, a persistency, or components of a computer system for performing the subject matter described in the present disclosure. The illustrated computer 802 is communicably coupled with a network 830. In some implementations, one or more components of the computer 802 can be configured to operate within different environments, including cloud-computing-based environments, local environments, global environments, and combinations of environments.

At a high level, the computer 802 is an electronic computing device operable to receive, transmit, process, store, and manage data and information associated with the described subject matter. According to some implementations, the computer 802 can also include, or be communicably coupled with, an application server, an email server, a web server, a caching server, a streaming data server, or a combination of servers.

The computer 802 can receive requests over network 830 from a client application (for example, executing on another computer 802). The computer 802 can respond to the received requests by processing the received requests using software applications. Requests can also be sent to the computer 802 from internal users (for example, from a command console), external (or third) parties, automated applications, entities, individuals, systems, and computers.

Each of the components of the computer 802 can communicate using a system bus 803. In some implementations, any or all of the components of the computer 802, including hardware or software components, can interface with each other or the interface 804 (or a combination of both), over the system bus 803. Interfaces can use an application programming interface (API) 812, a service layer 813, or a combination of the API 812 and service layer 813. The API 812 can include specifications for routines, data structures, and object classes. The API 812 can be either computer-language independent or dependent. The API 812 can refer to a complete interface, a single function, or a set of APIs.

The service layer 813 can provide software services to the computer 802 and other components (whether illustrated or not) that are communicably coupled to the computer 802. The functionality of the computer 802 can be accessible for all service consumers using this service layer. Software services, such as those provided by the service layer 813, can provide reusable, defined functionalities through a defined interface. For example, the interface can be software written in JAVA, C++, or a language providing data in extensible markup language (XML) format. While illustrated as an integrated component of the computer 802, in alternative implementations, the API 812 or the service layer 813 can be stand-alone components in relation to other components of the computer 802 and other components communicably coupled to the computer 802. Moreover, any or all parts of the API 812 or the service layer 813 can be implemented as child or sub-modules of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802 and the described functionality. The interface 804 can be used by the computer 802 for communicating with other systems that are connected to the network 830 (whether illustrated or not) in a distributed environment. Generally, the interface 804 can include, or be implemented using, logic encoded in software or hardware (or a combination of software and hardware) operable to communicate with the network 830. More specifically, the interface 804 can include software supporting one or more communication protocols associated with communications. As such, the network 830 or the interface's hardware can be operable to communicate physical signals within and outside of the illustrated computer 802.

The computer 802 includes a processor 805. Although illustrated as a single processor 805 in FIG. 8, two or more processors 805 can be used according to particular needs, desires, or particular implementations of the computer 802 and the described functionality. Generally, the processor 805 can execute instructions and can manipulate data to perform the operations of the computer 802, including operations using algorithms, methods, functions, processes, flows, and procedures as described in the present disclosure.

The computer 802 also includes a database 806 that can hold data for the computer 802 and other components connected to the network 830 (whether illustrated or not). For example, database 806 can be an in-memory, conventional, or a database storing data consistent with the present disclosure. In some implementations, database 806 can be a combination of two or more different database types (for example, hybrid in-memory and conventional databases) according to particular needs, desires, or particular implementations of the computer 802 and the described functionality. Although illustrated as a single database 806 in FIG. 8, two or more databases (of the same, different, or combination of types) can be used according to particular needs, desires, or particular implementations of the computer 802 and the described functionality. While database 806 is illustrated as an internal component of the computer 802, in alternative implementations, database 806 can be external to the computer 802.

The computer 802 also includes a memory 807 that can hold data for the computer 802 or a combination of components connected to the network 830 (whether illustrated or not). Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 (of the same, different, or combination of types) can be used according to particular needs, desires, or particular implementations of the computer 802 and the described functionality. While memory 807 is illustrated as an internal component of the computer 802, in alternative implementations, memory 807 can be external to the computer 802.

The application 808 can be an algorithmic software engine providing functionality according to particular needs, desires, or particular implementations of the computer 802 and the described functionality. For example, application 808 can serve as one or more components, modules, or applications. Further, although illustrated as a single application 808, the application 808 can be implemented as multiple applications 808 on the computer 802. In addition, although illustrated as internal to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion and management circuits, including recharging, standby, and power management functionalities. In some implementations, the power-supply 814 can include a power plug to allow the computer 802 to be plugged into a wall socket or a power source to, for example, power the computer 802 or recharge a rechargeable battery.

There can be any number of computers 802 associated with, or external to, a computer system containing computer 802, with each computer 802 communicating over network 830. Further, the terms "client," "user," and other appropriate terminology can be used interchangeably, as appropriate, without departing from the scope of the present disclosure. Moreover, the present disclosure contemplates that many users can use one computer 802 and one user can use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

Wireless connections within the scope of the present disclosure include wireless protocols, such as, 802.15 protocols (e.g., a BLUETOOTH®), 802.11 protocols, 802.20 protocols (e.g., WI-FI®), or a combination of different wireless protocols.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

Without in any way limiting the scope, interpretation, or application of the claims appearing below, a technical effect of one or more of the example implementations disclosed herein is providing an ability to operate and transport a work machine, such an agricultural vehicle, that has an obstructed forward view. Another technical effect of one or more of the example implementations disclosed herein is a reduction in time and cost associated with moving an agricultural machine that has an obstructed front view. For example, moving an agricultural machine from one location to another may involve disconnecting an implement connected to the agricultural machine, configuring the implement to be transported before moving the agricultural machine to another location to perform an agricultural operation, and reconnecting the implement once the agricultural machine has arrived at the new location. Another technical effect of one or more of the example implementations disclosed herein is avoiding the need and associated cost of another vehicle to transport the implement to another location.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. An agricultural machine comprising:
   a frame;
   a ground engaging component connected to the frame and configured to move the frame across a ground surface in a first direction corresponding to a forward direction of the agricultural machine and a second direction, opposite the first direction, corresponding to a reverse direction of the agricultural machine;
   a cab movably mounted to the frame, the cab including a forward wall and lateral sides, the cab further including an operator station including a direction control device operable to alter a direction of movement of the agricultural machine, the operator station configured to retain an operator;
   an actuator coupled to the cab, the actuator configured to move the cab from a first position to a second position relative to the frame in response to an input;
   an image capture device oriented to view an exterior of the agricultural machine towards the second direction and configured to capture an image of the exterior of the agricultural machine in the second direction; and
   a display configured to display the image captured by the image capture device, the display oriented to be viewable by the operator retained by the operator station when the cab is moved to the second position by the actuator.

2. The agricultural machine of claim 1, wherein the input is to configure the agricultural machine for travel in the second direction.

3. The agricultural machine of claim 2, wherein the input is to configure the agricultural machine into a road mode for travel along a road.

4. The agricultural machine of claim 1, further comprising an input device configured to receive the input from the operator.

5. The agricultural machine of claim 1, wherein the cab is pivotably mounted to the frame and the actuator is configured to pivot the cab relative to the frame between the first position and the second position.

6. The agricultural machine of claim 5, wherein the operator station is pivotable relative to the cab independently of the pivoting of the cab relative to the frame.

7. The agricultural machine of claim 1, wherein the display is connected to the cab.

8. The agricultural machine of claim 1, wherein the operator station comprises a seat disposed within the cab.

9. The agricultural machine of claim 8, wherein the display is connected to the seat.

10. The agricultural machine of claim 1, wherein the display is movable with the cab.

11. The agricultural machine of claim 1, wherein the display is configured to be viewable by the operator when operator is facing in the second direction.

12. The agricultural machine of 1, wherein the actuator is configured to pivot the cab 180° in response to receipt of the input.

13. The agricultural machine of 1, further comprising:
a body portion located rearward of the cab and limiting an operator's view rearward; and
wherein when the cab is in the first position facing forward the front wall is tilted forward, and when the cab is in the second position facing rearward the front wall is tilted rearward and the front wall is spaced from a nearest surface of the body portion.

14. A computer-implemented method performed by one or more processors for automatically configuring an agricultural machine for travel in a rearward direction, the method comprising:
receiving input to operate the agricultural machine in a rearward direction;
rotating a cab including a forward wall and lateral sides about a pivot axis relative to a frame of the agricultural machine from a first position to a second position by action of an actuator in response to the input, the cab including an operator station configured to retain an operator;
capturing an image from an image capture device, the image capture device oriented so as to be directed rearwardly; and
displaying the captured image on a display, the display configured to be viewable by the operator retained in the operator station when the cab is in the second position.

15. The computer-implemented method of claim 14, wherein the operator station includes a seat disposed in the cab.

16. The computer-implemented method of claim 14, wherein receiving input to operate the agricultural machine in a rearward direction includes receiving an input to configure the agricultural machine into a transport mode for operating the agricultural machine along a road.

17. The computer-implemented method of claim 14, wherein the display is mounted to and rotatable about the pivot axis with the cab.

18. The computer-implemented method of claim 14, wherein the operator station is rotatable relative to the cab independent of rotating the cab relative to the frame.

19. The computer-implemented method of claim 14, wherein:
the agricultural machine includes a body portion located rearward of the cab and limiting an operator's view rearward; and
when the cab is in the first position facing forward the front wall is tilted forward, and when the cab is in the second position facing rearward the front wall is tilted rearward and the front wall is spaced from a nearest surface of the body portion.

* * * * *